Feb. 25, 1958 L. C. BARLAND ET AL 2,824,458

GEAR

Filed May 25, 1956 8 Sheets-Sheet 1

INVENTOR
John R. Wald, Jr.,
William R. Shaffer, Lauri C. Barland.

BY Karl W. Flocks

ATTORNEY

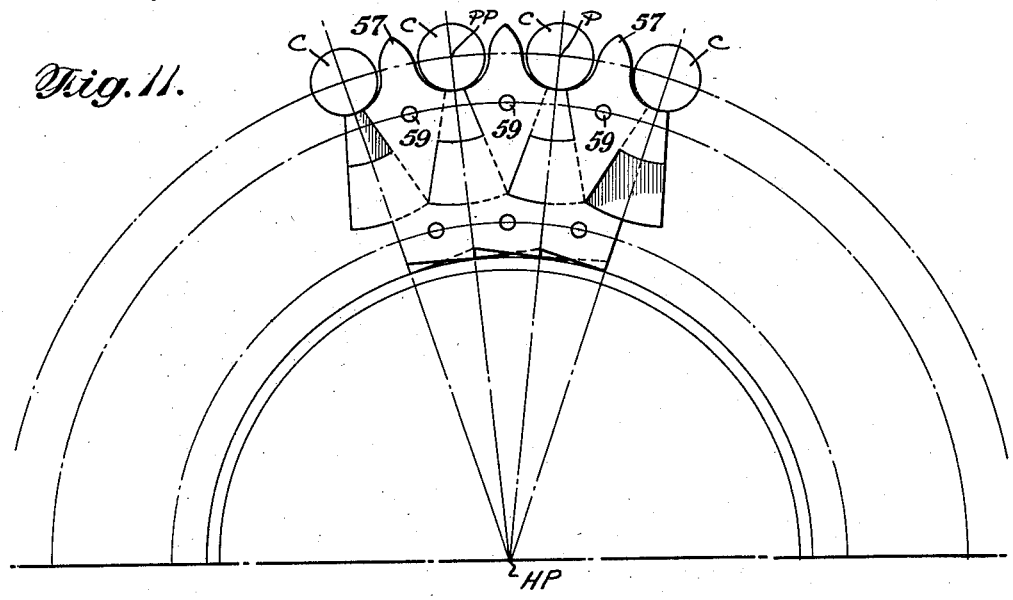
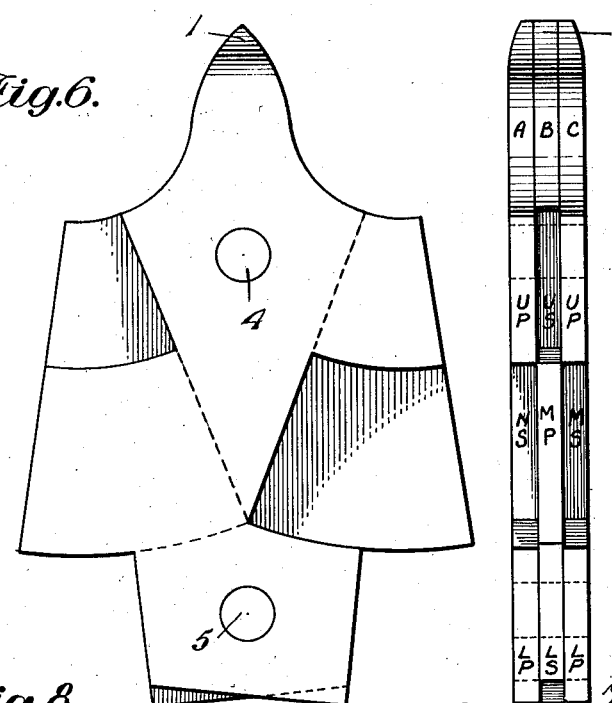
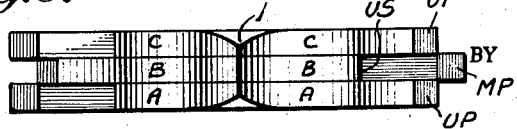

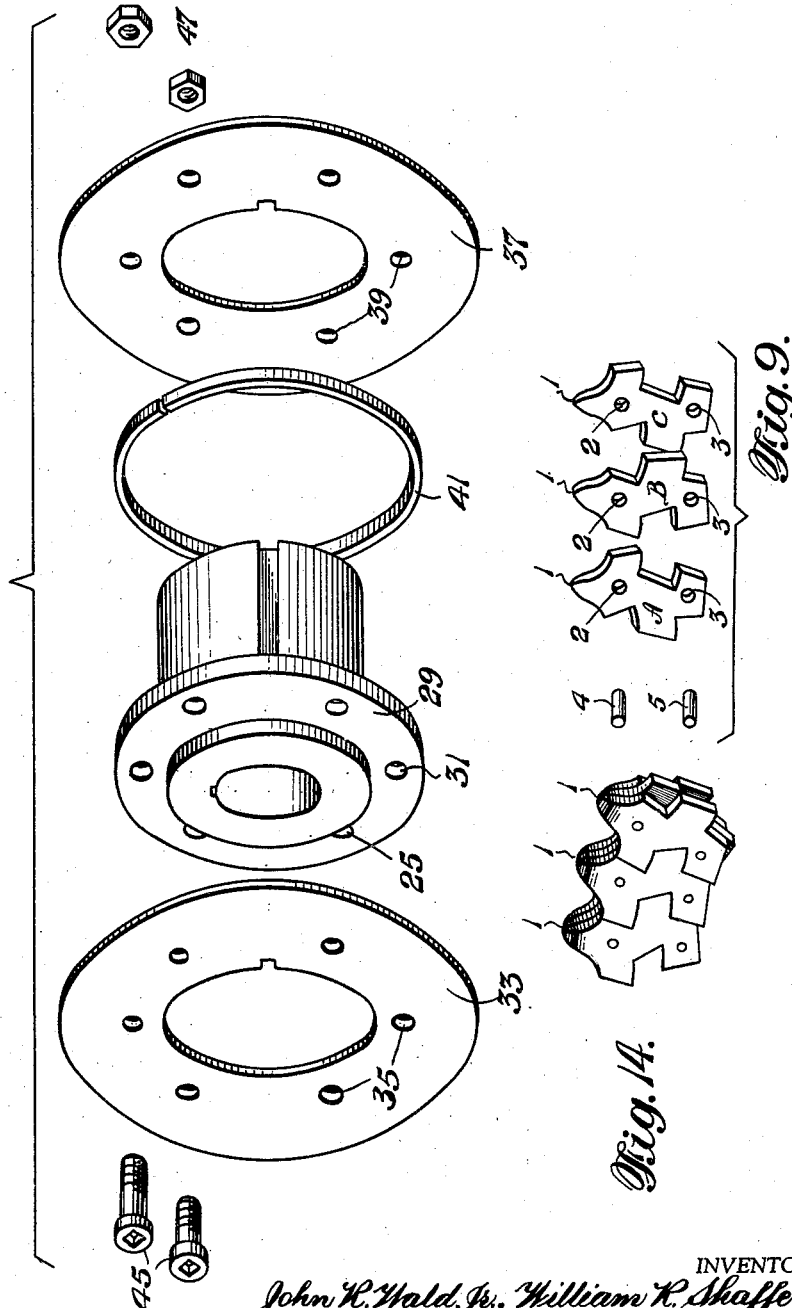

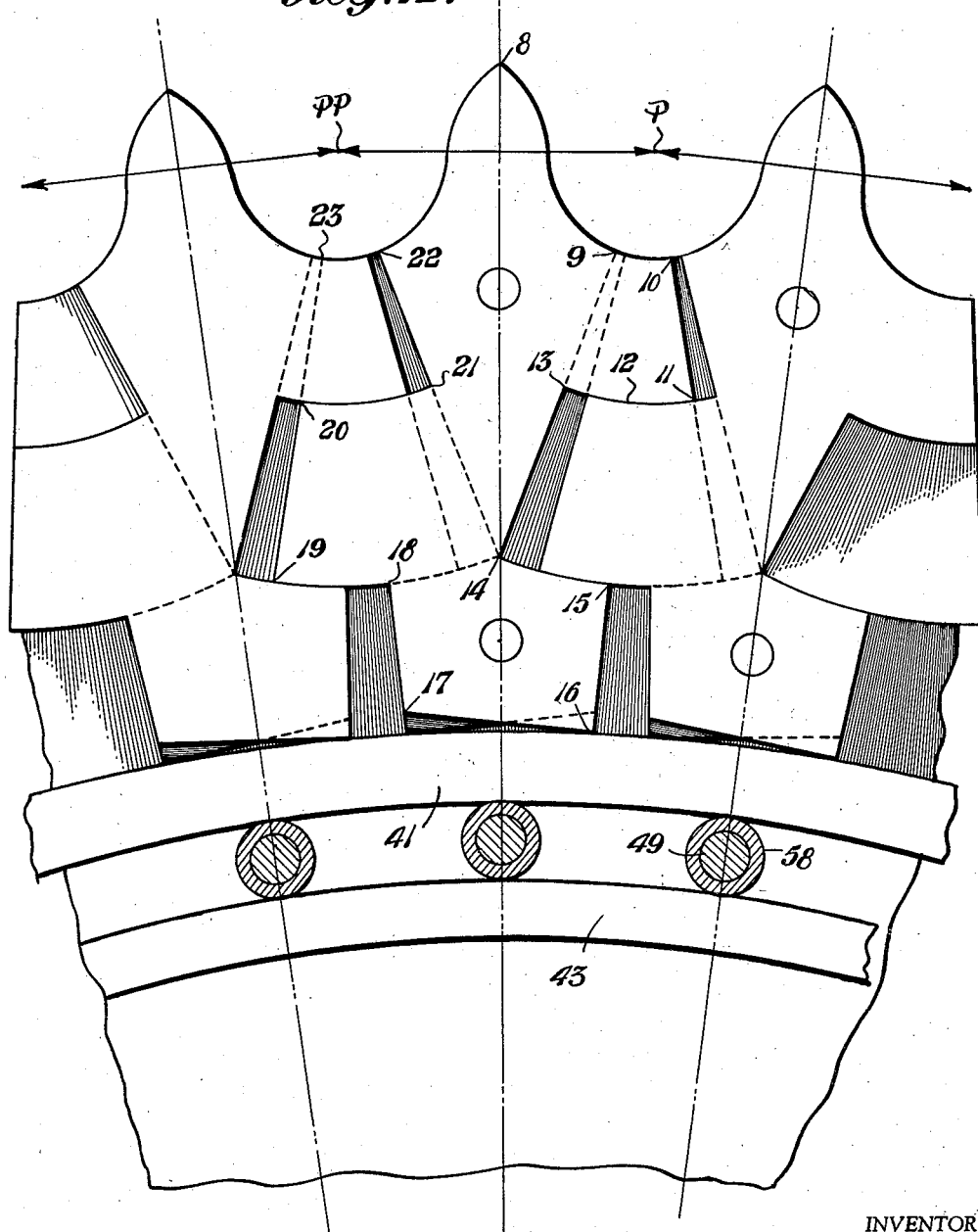

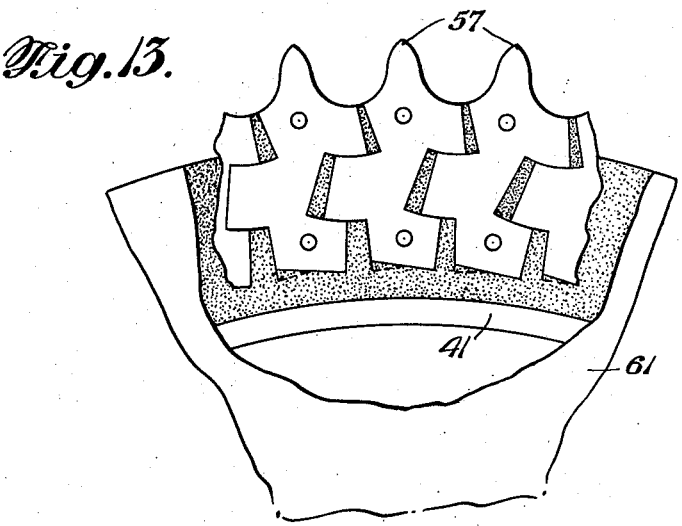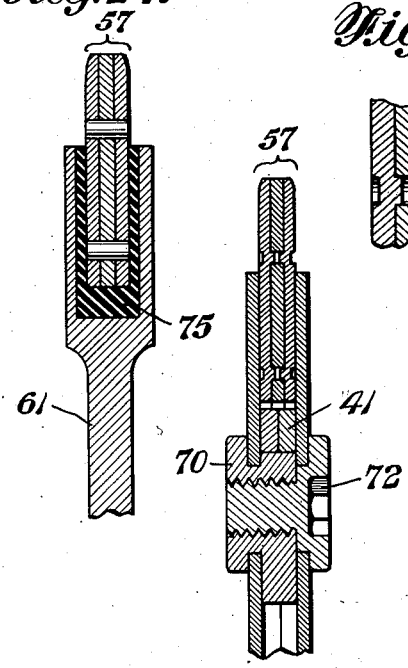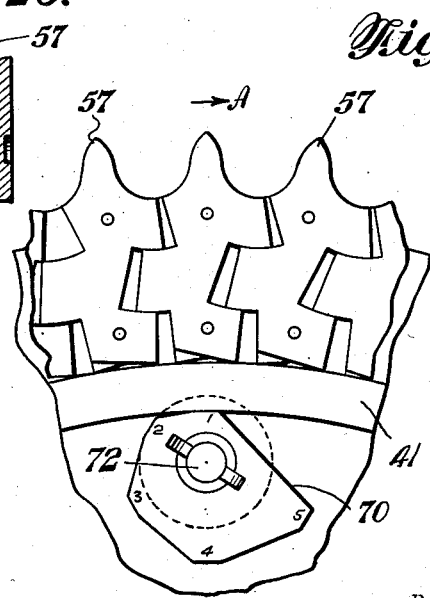

Feb. 25, 1958 L. C. BARLAND ET AL 2,824,458
GEAR
Filed May 25, 1956 8 Sheets-Sheet 6
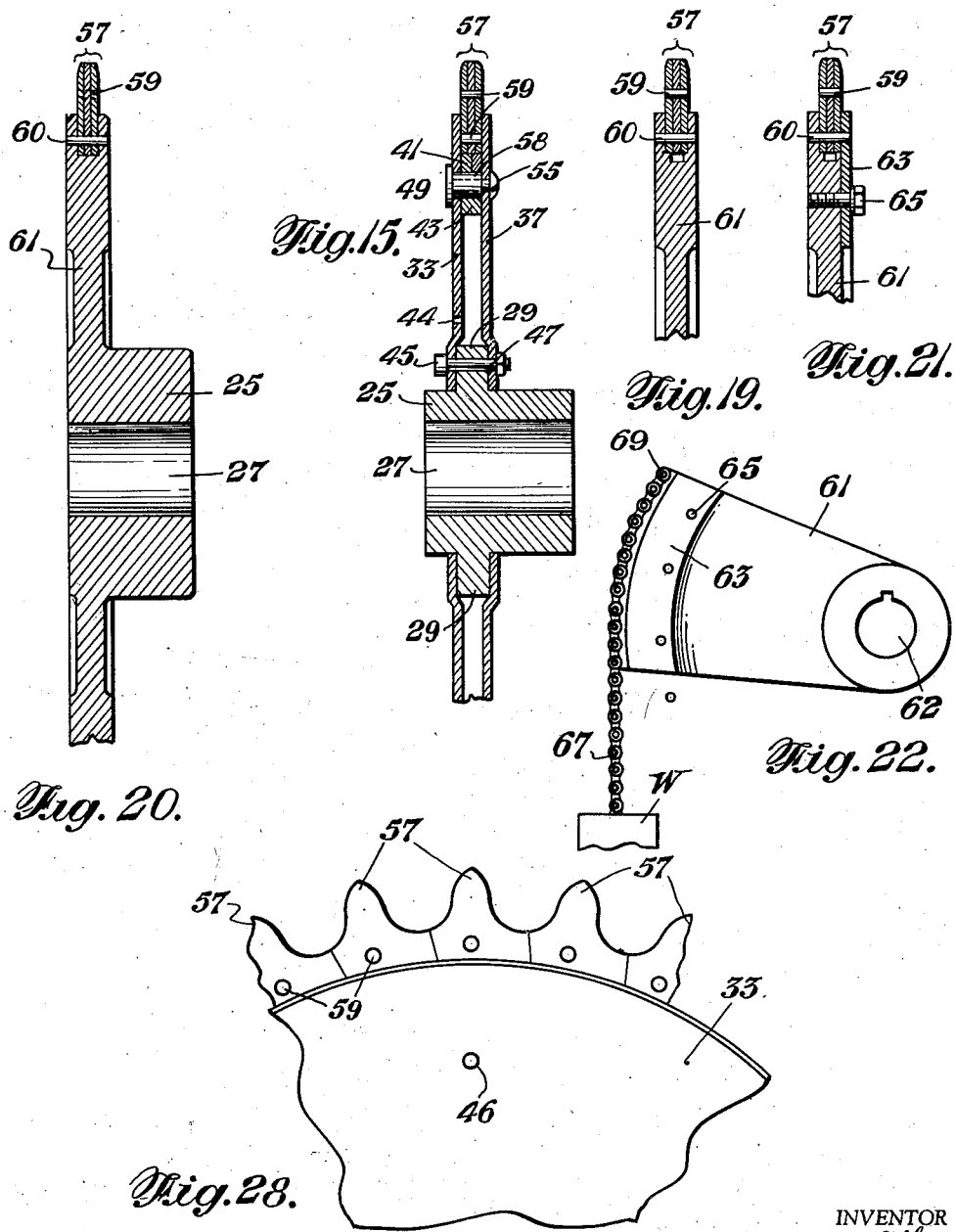
INVENTOR
John R. Wald, Jr., William R. Shaffer
and Lauri C. Barland
BY Karl W. Flocks
ATTORNEY Feb. 25, 1958 L. C. BARLAND ET AL 2,824,458
GEAR
Filed May 25, 1956 8 Sheets-Sheet 7

INVENTORS
John R. Wald, Jr., William R. Shaffer
and Lauri C. Barland.
BY Karl W. Flocks
ATTORNEY

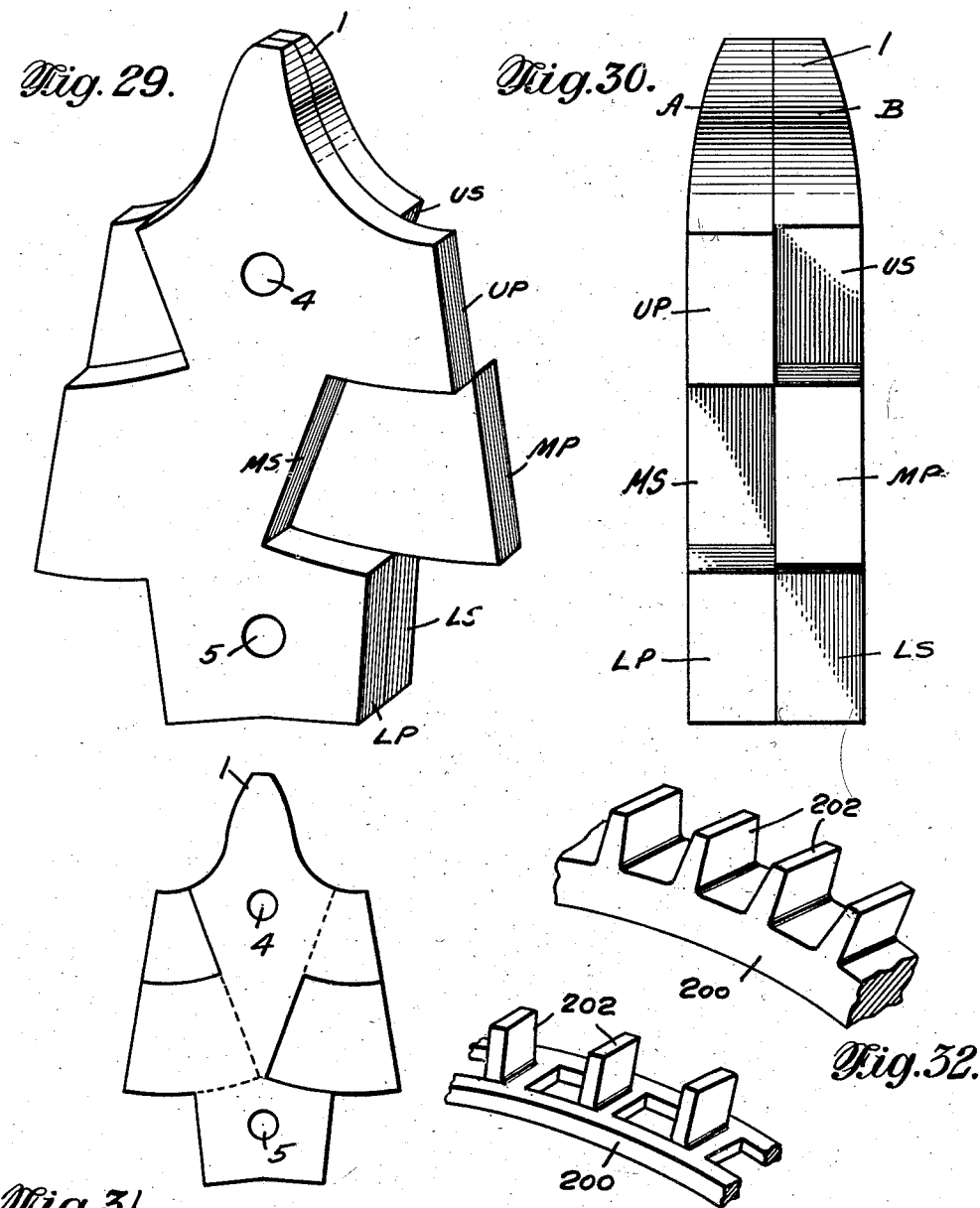

United States Patent Office 2,824,458
Patented Feb. 25, 1958

2,824,458

GEAR

Lauri C. Barland, West Chester, and William R. Shaffer and John R. Wald, Jr., Huntingdon, Pa., assignors to Wald Industries, Inc., Huntingdon, Pa., a corporation of Pennsylvania Application May 25, 1956, Serial No. 587,342

14 Claims. (Cl. 74—243)

The present invention generally relates to sprockets and the sprocket teeth members which can be used to form various types of sprockets. More particularly, this invention pertains to novel sprocket teeth which can be easily fastened in spaced relationship to one another to thereby form a sprocket of the desired pitch diameter and having the requisite number of teeth to engage a driving or driven member (e. g., a sprocket chain).

At the present time, nearly all of the sprockets used in connection with machinery are produced as a unitary whole by forging, stamping, molding, casting or machining, since these mass production methods usually assure the lowest manufacturing costs per sprocket. Each sprocket produced in accordance with any of the above-described manufacturing methods has a fixed pitch diameter and a fixed number of teeth which cannot be varied due to the fact that the teeth are an integral and continuous part of the entire sprocket. Consequently, once such a sprocket has been incorporated into a piece of machinery, the number of teeth cannot be decreased, increased or replaced without removing the entire sprocket and replacing it with another sprocket having a different pitch diameter. The aforementioned limitations upon the use of mass produced integral sprockets can sometimes be quite serious. For example, when one desires to substitute a new sprocket for the sprocket already in a machine, it may sometimes be difficult to immediately locate a substitute sprocket having the exact pitch diameter and the exact number of teeth desired. In such instances, it may be necessary to go to the time, trouble and expanse of specially producing the desired type of substitute sprocket if the machine is to be put into operating condition within a reasonably short period of time. This is also true when one or more teeth of a sprocket are damaged seriously enough to necessitate the replacement of the entire sprocket.

These limitations or deficiencies have not gone unrecognized and a few prior art workers have attempted to develop sprockets wherein the individual teeth are separable from the main body of the sprocket, but generally speaking, such sprockets have not enjoyed any considerable degree of commercial success because of certain inherent structural and design limitations. This invention presents a unique concept for overcoming some of the aforementioned limitations of integral sprockets. The sprocket tooth construction of this invention is new and different, is assembled in a different way and performs a different function than any prior art types of sprocket teeth, as will be more fully described hereinafter.

An object of this invention is to provide a new type of sprocket tooth which, when used in multiples of each other together with other simple components, can provide a sprocket of any desired pitch diameter and with any desired number of teeth.

A further object of this invention is to provide a sprocket constructed of individual teeth members which can be readily removed and replaced with a similar tooth when the original tooth becomes worn or damaged.

Another object of this invention is to provide a sprocket tooth which is capable of being laterally interlocked with the surfaces of adjacent sprocket teeth.

Another object of this invention is to provide a novel sprocket tooth form which conforms to the American Standards Association (A. S. A.) specifications and which results in a sprocket outline that varies as the number of teeth varies so as to closely maintain the A. S. A. form for every sprocket diameter.

An additional object of this invention is to provide a novel sprocket tooth construction whereby the full load received by one sprocket tooth is capable of being at least partially distributed to other adjacent sprocket teeth.

A further object of this invention is to provide a variety of sprocket components which are capable of receiving and holding sprocket teeth in the form of a sprocket wheel.

A particular object of the invention is to provide a sprocket tooth with lateral surfaces consisting of slots and projections which are adapted to slide within and interlock with slots and projection on the lateral surfaces of adjacent sprocket teeth.

Other objects and advantages of the instant invention will be apparent from the following description taken in conjunction with the accompanying drawings, wherein:

Figs. 6, 7 and 8 are front, right side and top views, respectively, of a second embodiment of a sprocket tooth encompassed by this invention;

Fig. 9 is an exploded perspective view of the sprocket tooth shown in Figs. 6, 7 and 8;

Fig. 11 is a front view of three interlocked sprocket teeth of the type shown in Figs. 6–8;

Figs. 12, 13 and 14 are front fragmentary views of interlocked sprocket teeth disposed as they would be on a sprocket;

Fig. 15 is a fragmentary vertical sectional view of a sprocket containing the novel sprocket teeth of this invention;

Figs. 16 and 23 are exploded perspective views showing an arrangement of the means which are designed to hold sprocket teeth in the form of a sprocket;

Figs. 17 and 18 are perspective views of two types of pitch rings;

Figs. 19, 20 and 21 are fragmentary sectional views of other types of sprockets which show various means for holding the sprocket teeth of this invention;

Fig. 22 is a fragmentary front view of a counterweight segment containing novel sprocket teeth;

Fig. 24 is a fragmentary front view of a sprocket and the manner in which a cam member may be used to alter the pitch diameter of said sprocket;

Fig. 25 is a fragmentary vertical sectional view taken along the line A—A of Fig. 24;

Fig. 26 is an enlarged fragmentary view of the sprocket tooth shown in Fig. 25;

Fig. 27 is a fragmentary vertical sectional view showing one means of affixing sprocket teeth into a sprocket;

Fig. 28 is a fragmentary front view of a sprocket;

Fig. 29 is a perspective view illustrating a third embodiment of a novel sprocket tooth in accordance with this invention;

Fig. 30 is a right side view of the sprocket tooth shown in Fig. 29;

Fig. 31 is a front view of the sprocket tooth shown in Fig. 29; and

Figs. 32 and 33 are fragmentary perspective views of spacers which are useful when employed in conjunction with the sprocket teeth of this invention.

One of the simplest embodiments of the sprocket teeth of this invention is illustrated in Figs. 1–5. In these figures, it will be seen that the sprocket tooth comprises a tooth edge portion T, a lower surface portion L, a substantially planar front face FF and a substantially planar and parallel back face BF, and two sharply indented side faces LSF and RSF. The right side face RSF can be considered as consisting of an upper projection UP, a middle slot MS, and a lower projection LP. The left side face LSF can be considered as consisting of an upper slot US, a middle projection MP and a lower slot LS.

Figure 1:
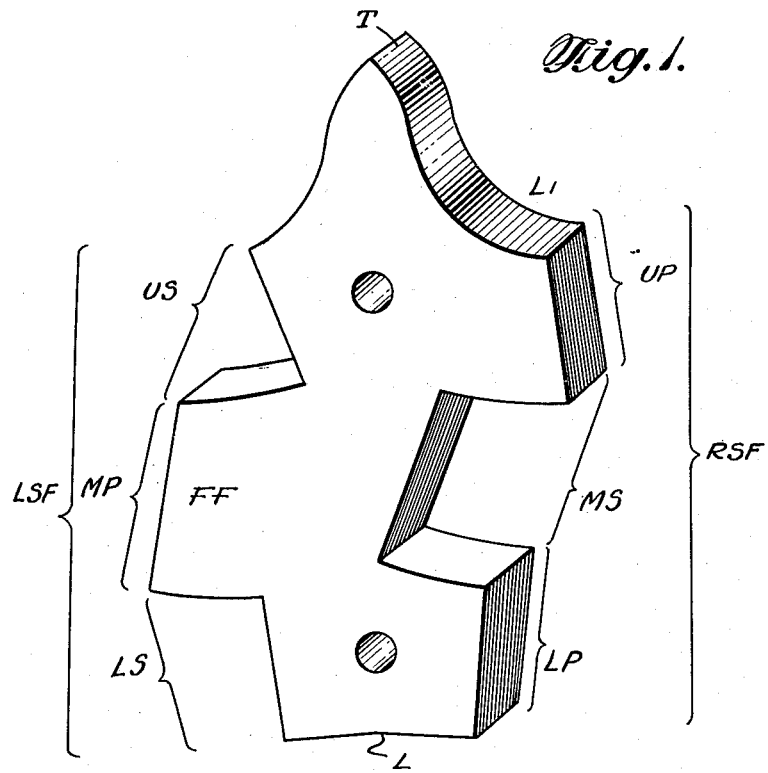
Fig. 1 is a perspective view illustrating one embodiment of a novel sprocket tooth of this invention.
Figures 2, 3, 4, 5:
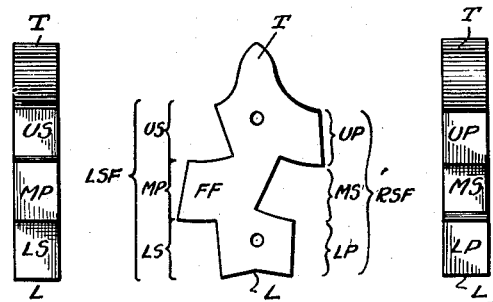
Fig. 2 is a left side view of the sprocket tooth shown in Fig. 1.
Fig. 3 is a front view of the sprocket tooth shown in Fig. 1.
Fig. 4 is a right side view of Fig. 1.
Fig. 5 is a top view of Fig. 1.
Figure 10:
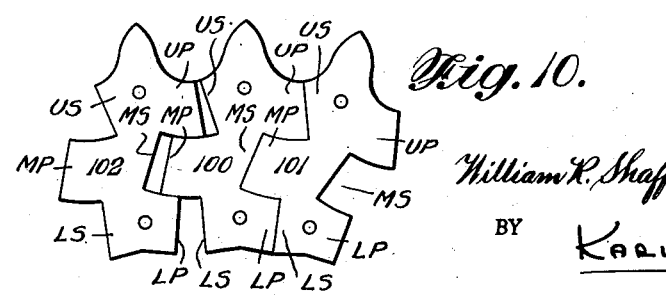
Fig. 10 is a front view of three interlocked sprocket teeth of the type shown in Figs. 1–5.

Referring now to Fig. 10, it will be seen that when a number of these identical sprocket teeth are disposed closely together in a side-by-side relationship, the corresponding slot portions and projection portions will come together in an interlocking relationship (e. g., UP with US; MS with MP; and LP with LS). Fig. 10 shows that the novel construction of the sprocket teeth of this invention permits the teeth to be either closely interlocked (100 and 101) or loosely interlocked (100 and 102) with adjacent sprocket teeth.

Before attempting to describe the various ways in which the aforementioned sprocket teeth can be used to form a sprocket, it is thought best to describe a second embodiment of a sprocket tooth encompassed by this invention. This second embodiment is quite similar to the first embodiment but at the same time is more complicated in its construction and use.

Front, side and top views of this second embodiment of a sprocket tooth are shown in Figs. 6, 7 and 8, respectively, and an exploded perspective view of this tooth is shown in Fig. 9. As is probably most clearly shown in Fig. 9, the sprocket tooth can be considered as consisting of three separate laminar sections which can be designated for illustrative purposes as a front section A, a middle section B and a back section C. It will be observed that sections A and C are substantially identical in size and shape. Middle section B is also of substantially the same size and shape as sections A and C, but as is best shown in Fig. 9, middle section B has been turned 180° with respect to sections A and C. It will also be seen then that sections A, B and C are of the same size and shape as the sprocket tooth of Figs. 1–5, the only difference being that sections A, B and C are only one-third as thick.

Referring to Fig. 9, it is seen that when the tooth edge portions 1, the upper openings 2, and the lower openings 3 are brought into alignment, the pins 4 and 5 may be placed in aligned openings 2 and 3, respectively, to thereby produce a unitary sprocket tooth such as is shown in Figs. 6, 7 and 8. (The aforementioned pins 4 and 5 may either be temporarily fixed within openings 2 and 3 or permanently fixed therein by welding, brazing, force fitting, etc.)

If one wished to compare the relationship of the sprocket tooth shown in Figs. 1–5 with the sprocket tooth shown in Figs. 6–9, it could be said that the sprocket tooth of Figs. 6–9 essentially amounts to a three-ply lamination, wherein the outside laminations have the same shape and configuration as the sprocket tooth shown in Figs. 1–5, while the middle layer of the lamination is also of the same size and shape as the outside laminations with the exception that it has been turned exactly 180°. Once this relationship between Figs. 1–5 and Figs. 6–9 is appreciated, one can readily see that a large number of variations suggest themselves and that by merely making laminations of the basic unit shown in Figs. 1–5, it would be possible to construct a sprocket tooth having any desired number of laminations, or any desired number and arrangement of interlocking slots and projections.

For example, a third embodiment of a sprocket tooth in accordance with this invention is shown in Figs. 29, 30 and 31. As can be seen, this third embodiment can be considered as a two-ply lamination wherein each of the two laminations has the same shape and configuration as the sprocket tooth shown in Figs. 1–5, the only difference being that the two laminations have been turned 180° with respect to one another.

Referring again to Fig. 7 and using the same alphabetical lettering system for the slots and projections which was used with Figs. 1–5, one can clearly see the disposition of slots and projections which result from the described lamination of the basic sprocket tooth member shown in Figs. 1–5.

Sprocket teeth of the type illustrated in Figs. 6–9 can be disposed either closely together in interlocking relationship (see Figs. 11 and 14) or not so closely together in interlocking relationship (see Figs. 12, 13 and 24) in basically the same fashion that the sprocket teeth of Fig. 10 come into interlocking relationship. One of the primary differences between the interlocking action of the sprocket teeth shown in Figs. 1–5 and the sprocket teeth shown in Figs. 6–9 is that the alternating projection-slot-projection arrangement of Fig. 7 (UP—US—UP) provides a more secure lateral interlocking action with the slot-projection-slot arrangement of an adjacent sprocket tooth than is possible with the simple projection-slot (essentially non-lateral) interlocking action of two sprocket teeth of the type shown in Figs. 1–5. More importantly, this arrangement provides better circumferential support and reduces individual tooth stresses. The projections extending out from both sides of the tooth increase the effective width of the tooth and thereby provide more and better support between adjacent teeth. Stated in other words, sprocket teeth of the type shown in Figs. 6–9 do not permit lateral movement (i. e. in a direction perpendicular to the plane in which the sprocket tooth is adapted to rotate) when adjacent sprocket teeth have been interlocked, while such lateral movement is possible even after interlocking when using the sprocket teeth of Figs. 1–5. This difference may or may not become important, depending upon the use to which the sprocket tooth is to be put, and also depending upon the manner in which the individual sprocket teeth are to be fastened to other components to form a sprocket.

It is also seen that the sprocket tooth of Figs. 6–9 presents a continuous upper bearing surface (e. g. for a sprocket chain) regardless of whether the slots and projections are spaced in a close or a not so close interlocking relationship, while the sprocket tooth of Figs. 1–5 does not present a continuous upper bearing surface unless the slots and projections of adjacent gear teeth are spaced as closely together as possible. This difference may or may not become important, depending upon the particular type of mechanism which drives or is driven by the sprocket teeth.

Before proceeding further, it should be noted that the slots and projections of the sprocket teeth of Figs. 1–9 and 29–31 each has a shape quite similar (if not identical with) the sector of an annulus. The point can be best appreciated and explained by referring to Fig. 12, wherein the numbered points 8 to 22 inclusive define the front face of a sprocket tooth of the type described in Figs. 6–9. In Fig. 12, it will be seen that the projection 9—10—11—13 and the slot 12—13—14—15 can each be considered as being sectors of an annulus because the straight lines 9—13, 10—11, 13—14, and 12—15 radiate outwardly from the common point P Also, the curved portions 9—10, 11—13 and 14—15 are arcs drawn about the point P. The point P is located on the pitch circle midway between adjacent teeth center lines. In a similar fashion, the projection 18—19—20—21 and the slot 20—21—22—23 can each be considered as being sectors of an annulus because the straight lines 14—21, 19—20 and 21—22 radiate outwardly from the common point PP. Also, the curved portions 18—19 and 20—21 are arcs centered around point PP; the point PP being also located on the pitch circle midway between adjacent teeth center lines. When the sprocket teeth contain projections and slots which are essentially sectors of an annulus (as explained above), then adjacent sprocket teeth can move relative to each other only by rotating about the point on the pitch circle of the sprocket lying midway between adjacent teeth center lines. The relation of points P and PP to each other (equidistant from the hub point HP) and their relation to closely interlocked gear tooth members, is also illustrated in Fig. 11.

The above described shape and structure of the sprocket tooth of this invention has a number of novel and important advantages. First of all, the novel sprocket teeth of this invention permits one to construct a sprocket having any desired number of teeth by simply adjusting the extent to which the slots and projections of adjacent teeth interlock with each other. For example, when adjacent sprocket teeth have their slots and projections pushed together as closely as possible (as in Figs. 11, 14 and 28), the resulting sprocket will contain the minimum number of teeth and the minimum pitch diameter. On the other hand, by moving the slots and projections of adjacent sprocket teeth away from each other (but still maintaining at least a partial interlocking relationship) one may produce a sprocket containing more than the minimum number of teeth and a pitch diameter greater than the minimum pitch diameter. The greater the distance between each of the sprocket teeth the greater will be the pitch diameter and the number of teeth in the sprocket.

It is further apparent that the uniquely constructed sprocket teeth of this invention, in addition to permitting considerable flexibility insofar as varying the number of teeth and the pitch diameter are concerned, have the further advantage that they will reduce impact and sprocket torsional fatigue loading due to the fact that the interlocking projection and slot arrangement of adjacent sprocket teeth serves to distribute such loads over several teeth instead of only one tooth.

Figures 16, 18:
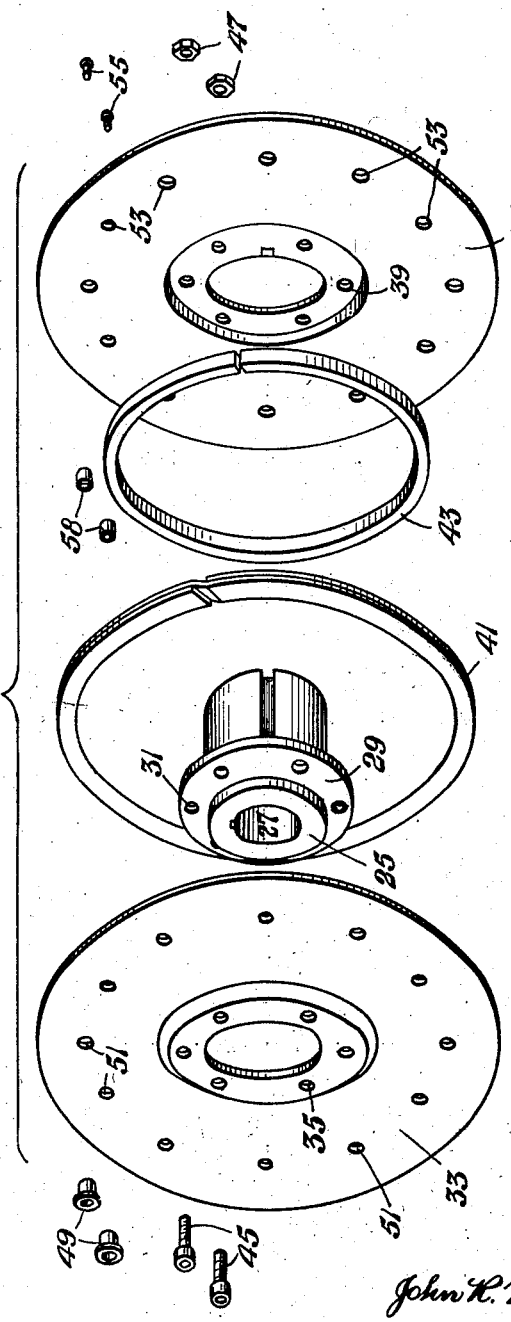
Figure 17:
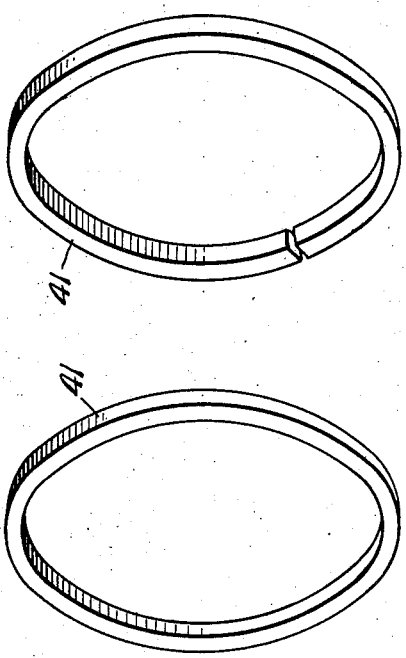

Referring now to Figs. 15 and 16, there is illustrated one possible way in which the sprocket teeth of this invention may be arranged with other components to form a sprocket. In these figures, a central hub 25, with a central bore 27 therein, has an upstanding peripheral abutting surface 29 containing a ring of bolt holes 31. Side plate 33 is adapted to fit closely up against one side of abutting surface 29, the ring of bolt holes 35 being adapted to be aligned with the ring of bolt holes 31. A substantially identical side plate 37 is adapted to fit closely up against the other side of abutting surface 29, the ring of bolt holes 39 being adapted to be aligned with the ring of bolt holes 31 and the bolt holes 35. Pitch ring 41 (shown as an overlapped split ring) is of less diameter than the diameter of either side plate, and accordingly, when the pitch ring 41 is placed between the two side plates 33 and 37, an annular slot is formed whose depth is dependent upon the difference between the diameter of the side plates and the diameter of the split ring. Thus, the depth of this annular channel may be varied by either using a side plate having a smaller or larger diameter or by using a pitch ring having a smaller or larger diameter. When the pitch ring consists of a split ring (as in Figs. 16 or 18) it is possible to distort the ring to achieve a limited range of diameters, but when the pitch ring is solid (as in Fig. 17), a new ring must be used for each diameter desired. A felt oil ring 43 (preferably of less diameter than the pitch ring 41) may be provided within the pitch ring 41 and between the side plates 33 and 37 to control the centrifugal flow of lubricant to the sprocket teeth. The lubricant (oil or grease) may be introduced through opening 44 as is shown in Fig. 15 and then flows outwardly by centrifugal action to the sprocket teeth. When powdered metal teeth are employed, it is possible that the lubricant can be caused to flow through the teeth to the area needing lubrication. Hub bolts 45 are adapted to pass through the aligned rings of bolt holes 35, 31 and 39 and the hub bolt nuts 47 secured thereto. Likewise pitch nuts 49 are adapted to pass through the aligned ring of bolt holes 51 and 53 to engage with pitch screws 55. Pitch ring spacers 58 are adapted to fit concentrically around pitch nuts 49 and serve to contact the inner periphery of the pitch ring. By varying the outside diameters of the pitch ring spacers it is possible to increase or decrease the depth of the aforementioned annular channel. When the annular channel is of the desired depth, the appropriate number of sprocket teeth (such as those shown in Figs. 1–9) are arranged therein. In Fig. 15, a sprocket tooth 57 of the type shown in Figs. 6–9 is shown, with pins 59 serving to align and bond together the sections of the sprocket teeth as previously explained in greater detail. While the sprocket teeth 57 are being positioned in the annular channel and in contact with the outer periphery of the pitch ring 41, the pitch screw 55 should be only loosely engaged with the pitch nut 49. As soon as all of the sprocket teeth are in the desired positions, the pitch screw 55 can be tightened up to the maximum degree so as to thereby cause the outer peripheral edges of side plates 37 and 33 to firmly grip and hold the sprocket teeth in the desired position. The pitch ring should be of slightly less thickness than the sprocket teeth 57. To further insure that the sprocket teeth will remain in the desired position, additional pins (not shown) may be passed through side plate 33, through the sprocket teeth 57 and through the side plate 37.

Fig. 28 serves to illustrate the point that, due to the firm interlocking action between adjacent sprocket teeth 57, it is quite feasible to construct a workable sprocket by simply passing a single fastening pin or bolt 46 between the front plate 33 and a corresponding back plate (not shown) to fasten them together.

By referring to Fig. 12, one may perhaps obtain a more detailed view and a better understanding as to how the pitch ring or spacer ring 41 is spaced in relationship to the sprocket teeth, the pitch ring spacers 58, the pitch nuts 49 and the oil ring 43.

Figs. 24 and 25 show how an irregular cam member 70 can be used as a variable pitch ring spacer. In these figures, a split pitch ring 41 can be caused to move in an outward direction (to thereby increase the pitch diameter) by merely turning the irregular cam member in a clockwise direction. The flat portions 1, 2, 3, 4 and 5 of irregular cam member 70 indicate that as each of these numbered areas come in contact with the pitch ring, the pitch ring is moved out far enough to allow the insertion of another sprocket tooth 57. Cam lock bolt 72 serves to lock irregular cam member 70 in any one desired position.

Fig. 26 is an enlarged view of a portion of the sprocket tooth 57 of Fig. 25. Fig. 26 shows that when using sprocket teeth of the type described in Figs. 6–9, one may bond the several sections of the sprocket tooth together by forming aligned raised and recessed portions in the faces of the several sections and thereafter forcing these raised and recessed portions into engaging relationship with one another.

Fig. 27 shows that if one so desires, the sprocket teeth 57 may be fixed within the annular channel of a single plate 61, by molding them there with a rubber or plastic composition 75.

Fig. 13 illustrates that when the sprocket teeth are disposed around a sprocket in such a fashion that the individual sprocket teeth are not closely interlocked together (as compared, for instance, with the sprocket teeth of Fig.

11), then a rubber or plastic composition (indicated by the dark shading) may be poured or placed between the incompletely engaged slots and projections to thereby decrease the noise and friction which would otherwise be caused by impact between the sprocket and chain C.

Referring now to Figs. 19 and 20, an arrangement is shown wherein one or more sprocket teeth may suitably be placed in the annular channel located in the outer periphery of a single plate 61 which is integral with a central hub 25 having a bore 27. A pin 60 passing through both the plate 61 and the sprocket tooth 57 serves to hold the sprocket teeth in their assigned position.

The arrangement of components in Fig. 21 is essentially similar in construction to the arrangement shown in Figs. 19 and 20, the only difference being that an additional locking plate 63 and locking screw 65 serve to both form one side of an annular channel for receiving the sprocket teeth and also to further insure against relative movement of the plate 61 and the sprocket teeth 57. Fig. 22 shows how the type of arrangement shown in Fig. 21 could be used in constructing a toothed counterweight segment. In Fig. 22, a weight W is attached to a sprocket chain 67 which, in turn, is attached at its upper extremity at point 69. The sprocket teeth 57 of Fig. 27 are at least partially held in a fixed position by locking plate 63 and locking bolts 65. Main plate 61 is, of course, adapted to rotate around in accordance with the rotation of axle 62.

The exploded perspective view shown in Fig. 23 is in many respects similar to Figs. 15 and 16 in that both figures show how a central hub, two side plates and a pitch ring can be combined to form an annular channel into which sprocket teeth can be placed. In Fig. 23, the side plates 33 and 37 are adapted to be fastened to either side of the upstanding peripheral abutting surface 29 (located on the central hub 25) by passing hub bolts 45 through the aligned bolt holes 35, 31 and 39 and engaging them with nuts 47. Pitch ring 41 is, of course, disposed between said two side plates. It will be noted that the side plates are made of sheet material with an annular portion near the outside edge slightly dished inwardly toward the pitch ring. The purpose of this particular construction is that after the sprocket teeth have been loosely placed in the annular channel formed by the side plates and the pitch ring, the pitch bolts can be tightened to thus apply greater pressure to the dished portions of the side plates which in turn serves to hold the sprocket teeth securely in the form of a sprocket.

In certain instances, and particularly on sprockets having many teeth, it may be desirable to provide additional tooth support and additional means for facilitating the spacing of the teeth relative to each other. This can be done by employing spacers which are adapted to fit between the lower portions of adjacent teeth (for example, between the faces LP and LS in Fig. 10). Any number of mechanical devices might be devised to provide the desired spacing, and two specific devices for this purpose are shown in Figs. 32 and 33. In Fig. 32, there is shown a molded spacer consisting of a thin circumferential plastic surface containing a plurality of radial molded-on projections 202 which are spaced to fit between adjacent teeth. The most desirable condition would be to have a different molded spacer for each sized sprocket desired, since the tooth spacing changes as the number of teeth on the sprocket changes.

An alternative would be to have several spacer strips molded of a soft material, such as rubber, which could be slightly compressed as the tooth chain is formed around the hub plate.

Fig. 33 illustrates another form of tooth spacer consisting of a thin circumferential surface 200 containing a plurality of radial projections 202 which are spaced to fit between adjacent teeth. These projections can be cut or stamped in the strip and then bent outward from the face of the strip and the height of the projections can be varied by grinding. Several different strip thicknesses will be required for a range of sprocket sizes. Alternatively, one could employ a stamping operation using adjustable dies to compress each projection to the proper thickness for any desired sprocket size.

The type of spacers shown in Figs. 32 and 33 can be used in addition to or in place of the spacers shown in the previous drawings.

Although the foregoing disclosure has been particularly directed to sprocket teeth and sprockets, those skilled in the art will readily appreciate that the teachings of this invention are applicable to other types of driving mechanisms such as gears, gear wheels, etc.

Also, although a number of the sprocket teeth shown in the drawings are indicated as consisting of several sections or plies which are held together with pins (e. g., Figs. 6–9), it should be understood that sprocket teeth of this identical shape and construction could just as well be produced by casting or molding in their entirety, cementing, welding, etc., thus eliminating the necessity for any pins whatsoever.

Also, because the sprocket teeth are entirely separate from the other components of the sprocket, they may be made from any available practical material including steel, iron, bronze, laminated fibers and plastics (e. g. nylon). Two preferred materials are powdered iron alone or powdered iron with copper as an alloy.

Whereas the sprocket teeth shown in the drawings have been shown to have specific configurations, it will be understood that the invention is by no means limited to these specific sizes, angles, curvatures or size ratios of one portion to another, since such factors are not critical so long as the hereinbefore described considerations regarding the novel functions which the sprocket teeth are to perform are kept in mind.

By utilizing the teachings of the present invention, it is possible to have instantly available sprockets having a wide variety of pitch diameters by merely stocking a central hub, a few side plates, a few pitch rings and an adequate supply of interchangeable sprocket teeth. It is also apparent that the desired sprocket may be assembled in a relatively short period of time and the assembled sprocket will be exactly the size desired for the operation to be performed. Worn or damaged teeth can be readily replaced without even removing the sprocket hub from its shaft.

Also, although the foregoing description has been primarily directed to single chain sprockets, it is obvious that multiple chain sprockets can easily be fabricated using the same basic components together with teeth spacers. It is also clear that sprocket drives utilizing only an annular tooth ring can be easily adapted to circular objects such as tumbling drums, retorts, autoclaves, etc. Sprockets having a non-circular outline can be fabricated from the same basic teeth and likewise sprockets having an infinite radius of curvature (rack form) can be produced.

It will be obvious to those skilled in the art that various changes may be made without departing from the spirit of the invention and therefore the invention is not limited to what is shown in the drawings and described in the specification but only as indicated in the appended claims.

What is claimed is:

1. A sprocket comprising an axially mounted circular member, an annular channel in the periphery of said circular member, and a plurality of sprocket teeth interlocked together in said annular channel, the bottom of said annular channel consisting of an expansible ring which is adapted to be varied in effective diameter by the application of force outwardly from the radial center of the ring.

2. A sprocket comprising an axially mounted circular member, an annular channel in the periphery of said circular member, a plurality of sprocket teeth interlocked together in said annular channel and means for progressively increasing the pitch diameter.

3. A sprocket comprising an axially mounted circular member, an annular channel in the periphery of said circular member, a plurality of sprocket teeth interlocked together in said annular channel and spacing means provided adjacent the lower end of each tooth for spacing the sprocket teeth a uniform distance apart.

4. A novel sprocket tooth comprising a tooth edge portion, a lower surface portion, two substantially planar and opposite front and back faces, two sides faces each of which is adapted to engage a portion of an adjacent sprocket tooth in an interlocking relationship, each of said side faces containing (1) at least one projection which is adapted to engage a slot located in the side face of an adjacent sprocket tooth and (2) at least one slot which is adapted to engage a projection located in the side face of an adjacent sprocket tooth, said slots and projections in each side face closely resembling the sectors of an annulus, and the arcs which define said sectors being concave with respect to the tooth edge portion and convex with respect to the lower surface portion.

5. A sprocket tooth as set forth in claim 4 wherein said front and back faces are disposed in planes which are substantially parallel to the plane in which the sprocket tooth is designed to rotate.

6. A sprocket tooth as set forth in claim 5 wherein said side faces each contain both horizontally and vertically aligned rows of at least one slot and one projection.

7. A sprocket tooth as set forth in claim 4 wherein said side faces each contain both horizontally and vertically aligned rows of at least one slot and at least one projection.

8. A sprocket comprising an axially mounted circular member, an annular channel in the periphery of said circular member, and a plurality of sprocket teeth as described in claim 4 disposed in said annular channel and interlocked together.

9. A sprocket as set forth in claim 8, wherein the bottom of said annular channel consists of an expansible ring which is adapted to be varied in effective diameter by the application of force outwardly from the radial center of said ring.

10. A sprocket as set forth in claim 8, wherein the sides of said annular channel are formed by opposed plates radially disposed on the same axially rotatable bearing member and the bottom of said annular channel is formed by an annular ring whose diameter is less than that of said opposed plates.

11. A sprocket according to claim 8, which additionally contains means for progressively increasing the pitch diameter.

12. A sprocket according to claim 8, wherein fastening means are provided in the circular member to secure the sprocket teeth in the desired position in said annular channel.

13. A sprocket according to claim 8, wherein spacing means are provided adjacent the lower end of each tooth for spacing the sprocket teeth in uniform distance apart.

14. In the known sprocket combination comprising a plurality of interlocking sprocket teeth located and fixed in a fastening means for holding the teeth in a secure position with respect to each other and with respect to the fastening means, the improvement of which comprises novel sprocket teeth each of which comprises a tooth edge portion, a lower surface portion, two substantially planar and opposite faces, two side faces each of which is adapted to engage a portion of an adjacent sprocket tooth in an interlocking relationship, one of said side faces containing (1) at least one projection, which is adapted to engage a slot located in the side face of an adjacent sprocket tooth and (2) at least one slot which is adapted to engage a projection located in the side face of an adjacent sprocket tooth, said slots and projections in each side face closely resembling the sectors of an annulus, and the arcs which define said sectors being concave with respect to the tooth edge portion and convex with respect to the lower surface portion.

References Cited in the file of this patent

UNITED STATES PATENTS

| 464,896 | Riddell | Dec. 8, 1891 |
| 527,153 | Murphy et al. | Oct. 9, 1894 |
| 2,003,029 | Albersheim | May 28, 1935 |

FOREIGN PATENTS

| 948,981 | France | Feb. 7, 1949 |